United States Patent
Domesle et al.

(10) Patent No.: US 6,685,900 B2
(45) Date of Patent: Feb. 3, 2004

(54) CATALYST FOR PURIFYING THE EXHAUST GASES OF DIESEL ENGINES, AND PROCESS FOR THE PREPARATION THEREOF

(75) Inventors: Rainer Domesle, Alzenau-Kälberau (DE); Harald Klein, Bessenbach (DE); Thomas Kreuzer, Karben (DE); Egbert Lox, Hanau (DE)

(73) Assignee: dmc² Degussa Metals Catalysts Cerdec AG, Frankfurt am Main (DE)

(*) Notice: Subject to any disclaimer, the term of this patent is extended or adjusted under 35 U.S.C. 154(b) by 327 days.

(21) Appl. No.: 09/789,718

(22) Filed: Feb. 22, 2001

(65) Prior Publication Data

US 2001/0043896 A1 Nov. 22, 2001

(30) Foreign Application Priority Data

Mar. 1, 2000 (EP) .............................. 00104212

(51) Int. Cl.⁷ .............................. B01J 8/02; B01J 29/06; B01J 21/00
(52) U.S. Cl. .................. 423/213.5; 502/64; 502/66; 502/73; 502/74
(58) Field of Search .................. 423/213.5; 502/64, 502/66, 73, 74

(56) References Cited

U.S. PATENT DOCUMENTS

| 5,849,255 A | 12/1998 | Sawyer et al. ........... 423/213.5 |
| 5,855,854 A | 1/1999 | Shinzawa et al. ........... 422/177 |
| 5,897,846 A | 4/1999 | Kharas et al. ........... 423/213.2 |
| 5,911,961 A | 6/1999 | Horiuchi et al. ......... 423/213.5 |
| 5,958,829 A * | 9/1999 | Domesle et al. ............ 502/333 |

FOREIGN PATENT DOCUMENTS

| DE | 39 40 758 A1 | 6/1991 |
| DE | 4213018 C1 | 12/1993 |
| DE | 196 14540 A1 | 10/1997 |
| DE | 197 53 738 A1 | 6/1999 |
| DE | 19821 144 A1 | 11/1999 |
| EP | 0 352 398 A1 | 1/1990 |
| EP | 0 427 970 A2 | 5/1991 |
| EP | 0 714 692 A1 | 6/1996 |
| EP | 0920 913 A1 | 6/1999 |
| EP | 0 920 913 A1 | 6/1999 |
| EP | 0 923 981 A2 | 6/1999 |
| WO | WO 94/22564 | 10/1994 |
| WO | WO 96/39244 | 12/1996 |

* cited by examiner

Primary Examiner—Stanley S. Silverman
Assistant Examiner—Jonas N. Strickland
(74) Attorney, Agent, or Firm—Kalow & Springut LLP

(57) ABSTRACT

A catalyst for purifying the exhaust gases of diesel engines, which catalyst contains at least one zeolite and, additionally, at least one of the support oxides aluminum oxide, silicon dioxide, titanium dioxide and aluminum silicate and at least one of the noble metals platinum, palladium, rhodium and iridium. In this catalyst the atoms of the noble metals have a mean oxidation number of less than +2.5, on average more than 3 metal ligands and less than 3 oxygen ligands and are present on the zeolites and support oxides in the form of crystallites having a mean particle size of from 1 to 6 nm.

21 Claims, No Drawings

CATALYST FOR PURIFYING THE EXHAUST GASES OF DIESEL ENGINES, AND PROCESS FOR THE PREPARATION THEREOF

INTRODUCTION AND BACKGROUND

The present invention relates to a catalyst for purifying the exhaust gases of diesel engines, which catalyst contains at least one zeolite and, additionally, at least one support oxide selected from the group consisting of aluminum oxide, silicon dioxide, titanium dioxide and aluminum silicate and at least one noble metal selected from the group consisting of platinum, palladium, rhodium, iridium, gold and silver.

The exhaust gas of diesel engines contains carbon monoxide (CO), unburned hydrocarbons (HC), nitrogen oxides ($NO_x$), sulfur dioxide ($SO_2$) and carbon black particles as atmospheric pollutants. The unburned hydrocarbons include paraffins, olefins, aldehydes and aromatic compounds. In comparison with the exhaust gases of gasoline engines, diesel exhaust gases contain a substantially higher proportion of not readily oxidizable, long-chained paraffins, which are for a large part condensed onto the carbon black particles as so-called VOF's (VOF=volatile organic fraction) and hence increase the particulate load of the exhaust gas. The sulfur dioxide contained in the exhaust gas originates from the sulfur content of the diesel fuel. By oxidation to sulfur trioxide, sulfates may form which likewise accumulate on the carbon black particles and increase the mass of the particles.

Moreover, diesel exhaust gases are leaner than stoichiometric in composition, which means that their oxygen content is higher than would be necessary for complete combustion of all combustible constituents of the exhaust gas. The oxygen concentration in diesel exhaust gas is usually from 3 to 10 vol. %, whereas in stoichiometrically composed exhaust gases of gasoline engines it is only about 0.7 vol. %.

The high oxygen concentration of diesel exhaust gases is based on the fact that diesel engines are operated with a high air/fuel ratio (kg of air/kg of fuel) of over 18. By contrast, stoichiometrically operated gasoline engines work with an air/fuel ratio of 14.6, which permits stoichiometric combustion of the hydrocarbons.

A further peculiarity of diesel exhaust gases is their substantially lower temperature as compared with the temperature of gasoline engines. In part-load operation, the exhaust gas temperature of modern diesel engines is in the range from 120 to 250° C., and it reaches a maximum temperature of from 550 to 650° C. only in full-load operation.

The actual composition of the exhaust gas of a diesel engine depends on the type of engine in question. Moreover, the development of diesel engines in the last 15 years has led to a continual change in the composition of diesel exhaust gas. Important developmental steps in this connection were the introduction of exhaust gas recirculation (EGR) and the continual further development of fuel injection systems such as "unit injector" and "common-rail". As a result of such developments it has been possible to reduce still further the nitrogen oxide emissions of diesel engines, which were already low as compared with gasoline engines, and exhaust gas temperatures have constantly been lowered further. Modern diesel engines for motor-cars exhibit nitrogen oxide emissions of less than 100 vol.-ppm in the majority of operating states of the engine.

The described particularities of diesel exhaust gases have made it necessary to introduce special exhaust gas purification systems for diesel engines. Successes in engine development and ever more stringent legal requirements as regards permissible emissions demand the continual further development of existing exhaust gas purification systems for diesel engines.

As well as reducing the particulate emission of diesel engines by introducing suitable diesel soot filters, the fundamental question initially was to reduce emissions of hydrocarbons by introducing suitable oxidation catalysts. Since the nitrogen oxide emissions of diesel engines were markedly higher about 10 years ago than they are today, it was important when developing such oxidation catalysts also to inhibit the further oxidation of nitrogen monoxide contained in the exhaust gas to nitrogen dioxide and the further oxidation of sulfur dioxide to sulfur trioxide.

Diesel oxidation catalysts having a reduced tendency to oxidize nitrogen monoxide and sulfur dioxide are described, for example, in patent specifications DE 39 40 758 C2, DE 42 13 018 C1 and U.S. Pat. No. 5,911,961.

A further step was the development of so-called "lean-$NO_x$" catalysts. Such catalysts are capable of reducing nitrogen oxides even in oxygen-rich exhaust gases. The unburned hydrocarbons still present in the diesel exhaust gas serve as the reducing agent. If the content of such hydrocarbons in the exhaust gas is not sufficient for the reduction of the nitrogen oxides, it can be increased accordingly by means of suitable measures in engine control or by the separate injection of diesel fuel. Of course, that also leads to a higher fuel consumption.

Lean-$NO_x$ catalysts are described in DE 196 14 540 A1, in EP 0 427 970 A2, in EP 0 920 913 A1 and in U.S. Pat. No. 5,897,846.

There have also become known catalysts that are said to improve the conversion of hydrocarbons and also of nitrogen oxides by storing the hydrocarbons at low exhaust gas temperatures and releasing them at higher exhaust gas temperatures. Such catalysts are described in U.S. Pat. No. 5,849,255, in WO 94/22564 and in WO 96/39244.

In the case of the first-mentioned oxidation catalysts, the reduced tendency to oxidize nitrogen monoxide and sulfur dioxide is achieved by additions of tungsten, antimony, molybdenum, nickel, vanadium, manganese and others. Vanadium is preferably used. Accordingly, the active component of the catalyst according to DE 39 40 758 C2 consists of platinum, palladium, rhodium and/or iridium in contact with vanadium or with an oxidic vanadium compound. The active component is deposited on finely divided aluminum oxide, titanium dioxide, silicon dioxide, zeolite and mixtures thereof. In order to prepare the catalyst, the oxidic support materials are first applied in the form of a dispersion coating to an inert carrier body. The dispersion coating is then impregnated with the active components. If mixtures of the various support oxides are used for the dispersion coatings, then all the constituents of the dispersion coating are coated uniformly with the active components in the subsequent impregnation.

DE 42 13 018 C1 also describes the use of aluminum oxide, titanium dioxide, silicon dioxide and zeolite as supports for the catalytically active components, which are present in the form of noble metals platinum, palladium, rhodium and/or iridium doped with vanadium or in contact with an oxidic vanadium compound.

The oxidation catalyst according to U.S. Pat. No. 5,911, 961 contains on a first support oxide platinum and/or palladium in conjunction with at least one metal selected from the group tungsten, antimony, molybdenum, nickel, manganese, iron, bismuth and others. The catalyst additionally contains further oxides selected from the group aluminum oxide, silicon dioxide, titanium dioxide, zirconium dioxide, aluminum silicate and, inter alia, also zeolites. The additional oxides are not coated with the catalytically active components.

The lean-$NO_x$ catalyst according to DE 196 14 540 A1 contains one or more zeolites and at least one platinum group metal. The catalyst additionally contains one or more support oxides selected from the group aluminum silicate, aluminum oxide and titanium dioxide. The catalytically active noble metals of that catalyst are deposited only on the additional support oxides.

EP 0 427 970 A2 describes a lean-$NO_x$ catalyst for decreasing the nitrogen oxides in an oxidizing exhaust gas having an air/fuel ratio of 22. The catalyst contains at least one zeolite having a molar ratio $SiO_2/Al_2O_3$ of greater than 10 and pore diameters of from 0.5 to 1 nm. Noble metals are deposited on the zeolites; for each platinum group metal, the weight ratio of the metal to the zeolite must not fall below a minimum value if good rates of conversion of nitrogen oxides are to be maintained even after ageing of the catalyst.

EP 0 920 913 A1 describes a process for the preparation of a further lean-$NO_x$ catalyst. As in DE 196 14 540 A1, that catalyst contains a plurality of zeolites as well as further support oxides and catalytically active noble metals, it being ensured by the preparation that the zeolites do not come into contact with the catalytically active components. As a result, the zeolites are to be prevented from being coked by the hydrocarbons contained in the exhaust gas.

The lean-$NO_x$ catalyst according to U.S. Pat. No. 5,897, 846 contains zeolites as support oxides for the catalytically active components. The catalytically active components are arranged on the zeolites at the outer surface in a shell having a thickness not exceeding 500 Å.

U.S. Pat. No. 5,849,255 describes an oxidation catalyst in which noble metals selected from the platinum group are deposited on two different support material components. The smaller support material component consists of aluminum oxide, titanium dioxide and mixtures thereof, while the larger support material component consists of zeolites. The high content of zeolites in the catalyst is required to store the hydrocarbons contained in the exhaust gas at low exhaust gas temperatures and release them again at higher exhaust gas temperatures and supply them to the oxidation by the noble metals.

WO 94/22564 claims an oxidation catalyst for treating diesel exhaust gases, which catalyst contains cerium oxide, zeolites and optionally aluminum oxide. The catalyst may optionally also contain platinum. The oxidation catalyst oxidizes the hydrocarbons and carbon monoxide contained in the diesel exhaust gas, and the VOF's. The hydrocarbons are retained in the pores of the zeolites during the cold-start phase or other phases during which the catalyst is relatively cold, until they can be effectively freed and oxidized by the catalyst during periods of relatively high temperature.

WO 96/39244 describes a catalyst for reducing the nitrogen oxide emissions of a diesel engine, which catalyst contains an adsorbent for hydrocarbons and a lean-$NO_x$ catalyst. Zeolites may be used as the adsorbent. The adsorbent adsorbs unburned hydrocarbons during colder phases of the operating cycle and releases them again during hotter phases of the operating cycle, so that the nitrogen oxides contained in the exhaust gas can be reduced thereby.

DE 197 53 738 A1 discloses a process for the preparation of an oxidation catalyst for treating diesel exhaust gases, which catalyst contains an aluminum silicate and a zeolite on which platinum in highly dispersed distribution is deposited. By suitably managing the impregnation of a powder mixture of aluminum silicate and zeolite, it is ensured that the platinum crystallites are deposited almost exclusively on the aluminum silicate.

An object of the present invention is to make available an improved oxidation catalyst for purifying the exhaust gases of modern diesel engines of motor-cars, the exhaust gases of which exhibit only low nitrogen oxide emissions, for example as a result of exhaust gas recirculation, and which contain only a small amount of sulfur dioxide owing to the use of low-sulfur fuels. The catalyst is in particular to exhibit a high oxidizing activity for carbon monoxide and hydrocarbons even at temperatures from 120 to 170° C. and that oxidizing activity is to have high resistance to ageing.

SUMMARY OF THE INVENTION

The above and other objects can be achieved by the present invention by a catalyst for purifying the exhaust gases of diesel engines that contains at least one zeolite and, additionally, at least one support oxide selected from the group consisting of aluminum oxide, silicon dioxide, titanium dioxide, zirconium dioxide and aluminum silicate and mixed oxides thereof and at least one of the noble metals selected from the group consisting of platinum, palladium, rhodium, iridium, gold and silver. The catalyst is characterized in that the atoms of the noble metals have a mean oxidation number of less than +2.5, on average more than 3 metal ligands and less than 3 oxygen ligands and are present on the zeolites and carrier oxides in the form of crystallites having a mean particle diameter size of from 1 to 6 nm.

Within the scope of this invention, a distinction is made between zeolites on the one hand and support oxides such as aluminum oxide, silicon dioxide, titanium dioxide, zirconium dioxide and aluminum silicate and mixed oxides thereof on the other hand, even though zeolites may also be used as support material for catalytically active components. Within the scope of this invention, a distinction is made in particular between aluminum silicates and zeolites. Zeolites are aluminum silicates having a particular crystal structure, which has a pronounced pore structure. By contrast, the crystal structure of the support oxides designated aluminum silicates within the scope of this invention is similar at low silicon dioxide contents to the structure of the aluminum oxides and becomes amorphous as the concentration of silicon dioxide increases. The crystal structure of those aluminum silicates is therefore markedly different from the structure of the zeolites, even where the composition as represented by a combination of elements is the same.

Support oxides and zeolites act in the catalyst as support materials for the noble metals. In order to enable the noble metals to be deposited in as highly a dispersed manner as possible on the support materials, preference is given to support materials having a high specific surface area (BET surface area; determined by evaluation of nitrogen adsorption isotherms according to DIN 66132) of more than 5 $m^2/g$.

The catalyst according to the invention exhibits especially low light-off temperatures for carbon monoxide and hydrocarbons. That is achieved by the combination of the support oxides aluminum oxide, silicon dioxide, titanium dioxide, zirconium dioxide and aluminum silicate and mixed oxides thereof with one or more zeolites, and by a high degree of dispersion and a highly metal-like state of the crystallites of the noble metals deposited on those materials. Accordingly, both groups of materials, both the support oxides and the zeolites, serve in the catalyst according to the invention as support materials for the catalytically active noble metals. "Metal-like" as the term is used herein means that the metal atoms in the crystallites have a mean oxidation number of less than +2.5 and on average more than 3 metal ligands and less than 3 oxygen ligands.

It has been found that a high catalytic activity can be achieved when the crystallites of the noble metals have mean particle diameters of less than 6 nm and at the same time are metal-like in the sense described above. These are two conflicting requirements, which can be fulfilled simultaneously only by maintaining particular measures during manufacture. A description is given below of how those requirements can nevertheless be fulfilled simultaneously. Despite those measures, however, increasing oxidation cannot be prevented in the case of metal crystallites having a mean diameter of less than 1 nm. In the case of such crystallites, therefore, the oxidation number of less than +2.5 cannot be maintained with the necessary reliability.

The particle size, oxidation number, number of metal and oxygen ligands can be determined on the fresh catalyst by suitable analytical methods. Testing using a transmission electron microscope is suitable for determining the mean particle sizes of the metal crystallites. To that end, the catalyst material is embedded in a suitable composition. A photographic image of a thin section (thickness about 100 nm) of the embedded material is then produced in the transmission electron microscope, and the particle size distribution of the platinum crystallites is determined by evaluation of up to 2000 platinum crystallites.

The mean oxidation number and the mean number of metal and oxygen ligands can be determined by means of X-ray absorption spectroscopy. In particular, the oxidation number is determined by XANES (X-Ray Absorption Near Edge Structure) and the number of metal and oxygen ligands is determined by EXAFS (Extended Absorption Fine Structure). The X-ray absorption spectroscopy is carried out on powder samples compressed to tablets having a thickness of 0.1 mm and with a measuring area diameter of 1 mm, so that it provides a reliable, integral statement regarding the mean oxidation number and the mean number of metal and oxygen ligands of the platinum crystallites over the measured volume.

The zeolites coated with the noble metals are of particular importance for achieving as low a light-off temperature as possible for the hydrocarbons in the diesel exhaust gas. Owing to their acid surface properties, zeolites have a high cracking activity for the long-chained hydrocarbons of the exhaust gas. The long-chained molecules are therefore broken down into smaller fragments by contact with the zeolites, which smaller fragments can then more readily be oxidized by the noble metals deposited on the zeolites.

The catalyst according to the invention does not therefore make use of the storage action of the zeolites for hydrocarbons, as does, for example, U.S. Pat. No. 5,849,255, but uses their catalytic properties to lower the light-off temperature for the oxidation of hydrocarbons as far as possible. Because of the low light-off temperature, large amounts of hydrocarbons are not stored on the zeolites. The proportion of zeolites in the catalyst is therefore calculated not according to the required storage capacity for hydrocarbons but according to the promoting action that they exert on the oxidizing activity of the catalytically active noble metals. As has been seen, that proportion may be kept substantially lower than is the case according to U.S. Pat. No. 5,849,255.

For the catalyst according to the invention, therefore, weight ratios between the support oxides and the zeolites of from 10:1 to 2:1 are totally sufficient, with preference being given to the use of weight ratios of from 8:1 to 3:1 and especially from 8:1 to 4:1. Especially advantageous and ageing-resistant oxidizing activities for carbon monoxide and hydrocarbons have been achieved with a weight ratio of 6:1. A higher proportion of zeolites in the catalytically active coating than corresponds to a weight ratio of 2:1 has an increasingly adverse effect on the catalytic activity. The reason for that is the inhibition of diffusion caused by the relatively small pores of the zeolites, which has a negative effect especially in the case of high space velocities. That effect is lessened by a relatively high content in the catalyst of the mentioned carrier oxides, which generally have substantially larger pores than zeolites and accordingly provide for rapid diffusion of the reactants to the catalytically active metal crystallites.

In order to achieve as high an oxidizing activity as possible for hydrocarbons, a concentration of noble metals on the zeolites that is only from 1 to 50% of the concentration of noble metals on the support oxides is sufficient. Accordingly, taking into account the weight ratio of support oxides to zeolites, there is obtained in the catalyst a mass ratio of the noble metals deposited on the zeolites to the noble metals deposited on the support oxides of from 1:100 to 1:10. The concentration of noble metals, based on the total weight, in the catalyst is preferably from 0.05 to 10 wt. %.

The support oxides aluminum oxide, silicon dioxide, titanium dioxide, zirconium dioxide and aluminum silicate have specific surface areas of more than 5, preferably of more than 50 and especially of more than 100 m$^2$/g. They may be used individually or in the form of a mixture. Binary or ternary mixed oxides of the mentioned support oxides are also suitable, especially an aluminum/silicon/titanium mixed oxide. For stabilization of their specific surface area towards high temperatures, the oxides may be doped in a known manner with suitable stabilizers, such as lanthanum oxide and/or barium oxide. The concentrations of the stabilizing components are, per component, from 0.5 to 20 wt. %, based on the total weight of the stabilized material.

In an especially advantageous embodiment of the catalyst, it contains a mixture of an aluminum silicate and at least one zeolite. Aluminum silicates having a silicon dioxide content of from 0.5 to 20 wt. %, preferably from 1 to 10 wt. %, and a specific surface area of more than 50 m$^2$/g are especially suitable.

Of the large number of zeolites available, the following are especially suitable beta-zeolites, zeolites of the faujasite type, such as, for example, Y-zeolites, especially de-aluminized Y-zeolites, mordenites and zeolites, having a high silicon dioxide content, of the pentasil type, especially ZSM-5. They may be used individually or in the form of a mixture. Such zeolites are preferably used in their acid H+ form. De-aluminized Y-zeolites and ZSM-5 zeolites, each having a modulus of more than 30, preferably of more than 40, have proved especially suitable. The modulus of a zeolite denotes its molar ratio of silicon dioxide to aluminum oxide. Platinum is preferably used as the noble metal.

For the preparation of the catalyst according to the invention, the support materials (support oxides and zeolites) are impregnated with precursor substances of the noble metals based on amine-complexed compounds, such as, for example, ethanolamineplatinum(IV) hexahydroxide, and then calcined. It has been found that amine-complexed compounds are most suitable for maintaining the required particle sizes of from 1 to 6 nm. The formation of small and very homogeneously distributed metal crystallites is assisted by calcination of the impregnated powder material by so-called flash or spray calcination. In the case of spray calcination, the still moist support material impregnated with the precursor substances is blown into a stream of hot gases having a temperature of from 500 to 1000° C. and both dried and calcined in the course of a few seconds, generally in the course of less than one second. The powder materials can be appropriately conditioned by the use of gases having a reducing or oxidising action. The optimum dwell times of the powder materials in the hot stream of gas are from 0.1 to 10 seconds. The hot gases required for spray calcination are generally produced by burning an air/fuel mixture, with natural gas preferably being used as the fuel. A description of spray calcination will be found in DE 198 21 144 A1 which is relied on herein for that purpose.

As has been found, spray calcination ensures that the crystallites of the noble metals are distributed very finely on the surface of the support materials, because there is no time during the calcination, which lasts only seconds, for the crystallites to combine to form larger agglomerates.

Loading of the support oxides and of the zeolites with different noble metals can be achieved by preparing the powder materials separately.

The powder materials catalyzed with the noble metals are processed to a preferably aqueous coating dispersion. To that end, they are dispersed in water and ground and homogenized in a ball mill to a uniform particle size of from 2 to 5 µm. They are then applied in the form of a coating to the inside walls of the flow channels of conventional monolithic honeycomb bodies which function as carriers for the catalyst. For fixing of the coating to the honeycomb body, it is dried and calcined. The calcination takes place at temperatures of from 300 to 600° C. for a duration of from 0.5 to 4 hours.

In order to fulfil the requirements regarding the oxidation number of the noble metals and the adjacent metal atoms, the coating of the finished catalyst must be reduced in a final operation, for example in a stream of gas containing hydrogen. Forming gas (95 vol. % nitrogen+5 vol. % hydrogen) is preferably used therefor. As combined testing using transmission electron microscopy (TEM) and X-ray absorption spectroscopy (XANES, EXAFS) has shown, the noble metals of the catalysts so prepared have an average oxidation number of less than +2 and a number of immediately adjacent noble metal atoms of approximately 4.

The number of oxygen ligands is approximately 2. The test methods TEM, XANES and EXAFS mentioned here are so-called "bulk testing methods" and accordingly provide only average values averaged over the entire catalyst. The individual oxidation number, number of ligands, etc. of a noble metal atom may, of course, deviate from that mean value. These values indicate that the noble metal crystallites have largely been reduced and accordingly are very close to the metal state. That "metal-like state" of the noble metals can be achieved only using noble metal precursor compounds that possess organic ligands, such as, for example, ethanolamine in the case of the compound ethanolamineplatinum(IV) hexahydroxide. By the use of such noble metal precursor substances having organic ligands, autoreduction of the platinum occurs in the course of the calcination, which takes place under an oxygen atmosphere. Platinum particles having oxidation numbers below +2, which correspond to a very high activity, are obtained thereby. A subsequent reduction process in a nitrogen/hydrogen stream leads to a further reduction in the oxidation number and accordingly to an even more pronounced conversion to the "metal-like state". The coating concentration on the honeycomb body depends on the particular application in question and is generally from 50 to 400 grams per liter of honeycomb body.

DETAILED DESCRIPTION OF INVENTION

The catalyst according to the invention is excellently suitable as an oxidation catalyst for purifying the exhaust gases of a diesel engine, which gases, as a result of measures at the engine, such as, for example, exhaust gas recirculation, exhibit only a very low concentration of nitrogen oxides (less than 100 ppm) and the temperature of which varies in the range from 100 to 500° C. during operation.

Tests of the Coking of Support Materials by Adsorption of Hydrocarbons:

The catalyst according to the invention is used in the exhaust gas of diesel engines having predominantly very low exhaust gas temperatures. It is therefore exposed to the risk of contamination and coking by the deposition of VOF's on the support materials. For that reason, the tendency of support materials to be coked by the absorption and cracking of hydrocarbons has been tested hereinbelow. An aluminum silicate (hereinafter referred to as $Al_2O_3/SiO_2$) having a silicon dioxide content of 5 wt. % and a specific surface area of 153 $m^2/g$ and a Y-zeolite having a modulus of 60 were tested. Both the pure powder materials and powders catalyzed with platinum were tested. The powders catalyzed with platinum were prepared as described in Example 1.

To determine the coking tendency, in each case 2 g of the powder material were placed in a porcelain dish and impregnated with 1 g of a petroleum distillate (mixture of paraffinic, naphthenic and aromatic hydrocarbons in the range from $C_{10}$ to $C_{16}$; Hydrosol P 180 HC from Veba-Oel) and then ground in a mortar for 3 minutes. The moist, homogenized powder was distributed on an aluminum film and dried under an infra-red lamp at 150° C. for 30 minutes. The cracking activity of the powder so treated was first assessed qualitatively, visually. A quantitative determination of the hydrocarbon deposition was then carried out by oxidation of the hydrocarbon by means of oxygen and determination of the resulting carbon dioxide by UV spectroscopy. The quantitative determination confirmed the qualitative, visual assessment.

The results of that test are given in Table 1. A powder mixture (powder 5 in Table 1) consisting of six parts by weight of powder 2 and one part by weight of powder 4 was also tested.

The results of this series of tests clearly show that the pure support materials without platinum, especially the Y-zeolite, possess a very high degree of cracking activity. On continuous operation of a diesel engine in the low-load range it is therefore to be expected that a large amount of the hydrocarbons contained in the exhaust gas will be deposited on uncatalyzed support materials and cracked. The pores of the support oxides and of the zeolites become "gummed up" and are no longer available for the catalytic processes. The result is a marked deterioration in the activity of the catalyst.

If, on the other hand, the support oxides and the zeolites are impregnated with platinum, the tendency to deposition of hydrocarbons falls very considerably, since the fragments of the hydrocarbons formed by the cracking are oxidized on platinum almost completely to $CO_2$ and $H_2O$ even at relatively low temperatures of above 150° C. The deposition of hydrocarbons and an associated constant deterioration in the catalytic activity are thus prevented. Accordingly, the hydrocarbons that are deposited are continuously burnt. As a result, the accumulation of hydrocarbons on the catalyst is avoided. Such an accumulation would lead at elevated exhaust gas temperatures to a sudden burning of the accumulated hydrocarbons and to the evolution of a large amount of heat, and would damage the catalyst thermally.

TABLE 1

Determination of the coking tendency of support materials and catalyst formulations

| No. | Powder | Pt content | Visual assessment | Carbon content |
|---|---|---|---|---|
| 1 | $Al_2O_3/SiO_2$ | — | white → brown | 0.15 |
| 2 | $Al_2O_3/SiO_2$ | 0.95 | grey → grey | 0.02 |
| 3 | Y-zeolite | — | white → dark brown | 1.78 |
| 4 | Y-zeolite | 0.05 | light grey → light grey | 0.03 |
| 5 | powder 2 + powder 4 | 0.82 | light grey → light grey | 0.03 |

EXAMPLE 1

A catalyst consisting of a mixture of two platinum-catalyzed powders was prepared.

For the preparation of powder 1, 1 kg of an aluminum silicate (5 wt. % silicon dioxide; specific surface area: 153 m²/g) was placed in a dragée-making vessel. The aluminum silicate had a water absorption capacity of 800 ml/kg. While continuously being circulated, the aluminum silicate was sprayed with 766 ml of an aqueous solution of ethanolamineplatinum(IV) hexahydroxide $((EA)_2Pt(OH)_6$=$(HO-C_2H_4-NH_3)_2^+Pt^{IV}(OH)_6)$ at a volume flow rate of 56 ml/(kg.min). The still pourable, moist powder was calcined by being blown into a hot stream of gas, produced by methane combustion, at a gas temperature of 780° C. and with a dwell time in the stream of gas of about one second (spray calcination).

The Pt-aluminum silicate powder (powder 1) so prepared had a platinum content of 2.79 wt. %.

For the preparation of powder 2, 1 kg of a Y-zeolite having a modulus of 60 was placed in a dragée-making vessel. The zeolite had a water absorption capacity of 1350 ml/kg. While continuously being circulated, the Y-zeolite was sprayed with 242 ml of an aqueous solution of ethanolamineplatinum(IV) hexahydroxide at a volume flow rate of 56 ml/(kg.min). The still pourable, moist powder was calcined like powder 1.

The Pt-zeolite powder (powder 2) had a platinum content of 0.88 wt. %.

6 parts of powder 1 and one part of powder 2 were dispersed in water and homogenized by grinding in a ball mill. The solids concentration of the finished coating dispersion was 35 wt. %. The pH value of the coating dispersion was 6.5. An open-cell honeycomb carrier body of cordierite having a diameter of 11.83 cm, a length of 7.6 cm, a cell density of 62 cm$^{-2}$ and a wall thickness of the flow channels of 0.2 mm was coated with 126 g of dry composition per liter of honeycomb body volume by being immersed in the dispersion. The coating was dried in the air at 120° C. and calcined in the air for 4 hours at 300° C. and finally reduced in a stream of forming gas for 2 hours at 500° C.

The finished catalyst contained 3.17 g of platinum per liter of catalyst volume.

Table 2 shows the most important preparation conditions for the catalysts of this and the following Examples. Table 3 contains the results of the physicochemical analyses of the catalysts by means of transmission electron microscopy (TEM) and X-ray absorption spectroscopy (XANES, EXAFS).

The catalyst of Example 1 exhibited very uniform distribution of the platinum particles having particle sizes from 1 to 5 nm on the support materials. The average oxidation number was two and the number of immediately adjacent platinum atoms was four. This result indicates that the platinum particles on the support materials have largely been reduced and accordingly resemble the metal state.

Application Examples 1 to 3 show that the metal-like state leads to very high catalytic activity of the catalyst, which is markedly superior to the prior art (catalysts of Comparison Examples CE1 to CE5) in terms of both fresh activity and service life.

EXAMPLE 2

A second catalyst was prepared according to Example 1.

In contrast to Example 1, the platinum load on the powder was almost halved. Powder 1 (Pt-aluminum silicate) had a platinum content of 1.24 wt. %, and powder 2 (Pt-Y-zeolite) had a platinum content of 0.38 wt. %.

6 parts of powder 1 and one part of powder 2 were dispersed in water and treated as specified in Example 1. The load of the coated honeycomb body was likewise 126 g of dry composition.

The finished catalyst contained 1.41 g of platinum per liter of catalyst volume.

The results of the physicochemical tests corresponded to those of Example 1 and are listed in Table 3.

EXAMPLE 3

A third catalyst was prepared according to Example 1.

The honeycomb carrier body was coated with the coating dispersion of Example 2. In contrast to Example 2, however, the load of the honeycomb body was halved to 63 g of dry composition.

The finished catalyst contained 0.705 g of platinum per liter of catalyst volume.

The results of the physicochemical tests corresponded to those of Example 1 and are listed in Table 3.

COMPARISON EXAMPLE 1

A comparison catalyst having a catalytic coating according to DE 197 53 738, Example 1, was prepared.

1 kg of a mixture of aluminum silicate and Y-zeolite in a weight ratio of 6:1 was placed in a dragée-making vessel. The mixture had a water absorption capacity of 1020 ml/kg. While continuously being circulated, it was sprayed with 833 ml of an aqueous solution of ethanolamineplatinum(IV) hexahydroxide at a volume flow rate of 56 ml/(kg.min). The still pourable powder was dried in an oven at 150° C. for a period of 12 hours and was then calcined in the air for a period of 4 hours at 300° C. in order to fix the platinum. This conventional type of calcination is referred to as oven calcination hereinbelow. The powder so prepared contained 2.52 wt. % platinum, based on its total weight.

The powder was dispersed in water and homogenized by grinding in a ball mill. The solids concentration of the finished coating dispersion was 35 wt. % at a pH value of 6.5. A honeycomb body was coated with 126 g of dry composition per liter of honeycomb body volume by being immersed in the dispersion. The coating was dried in the air at 120° C. and calcined in the air for 4 hours at 300° C. and finally reduced in a stream of forming gas for 2 hours at 500° C.

The finished catalyst contained 3.17 g of platinum per liter of catalyst volume.

Physicochemical testing of the catalyst showed uniform distribution of the platinum particles having particle sizes from 3 to 8 nm. The average oxidation number of the platinum atoms was 2.5, and the number of immediately adjacent platinum atoms was 2.

COMPARISON EXAMPLE 2

A further comparison catalyst was prepared according to Comparison Example 1. In contrast to Comparison Example 1, the catalyst was not reduced in a final step.

Physicochemical testing of the catalyst showed uniform distribution of the platinum particles having particle sizes from 3 to 8 nm. The average oxidation number of the platinum atoms was 3.0, and the number of immediately adjacent platinum atoms was 0.5.

COMPARISON EXAMPLE 3

A further comparison catalyst was prepared analogously to Comparison Example 1. In contrast to Comparison Example 1, however, the powder mixture impregnated with platinum was not calcined but immediately processed to an aqueous coating dispersion. The dispersion had a pH value of 6.5. Analysis of the aqueous phase of the coating dispersion gave no indication of detached platinum constituents.

A further honeycomb body was coated with the above dispersion, dried, calcined and reduced. The coating amounts were identical with those of Comparison Example 1.

Physicochemical testing of the catalyst showed uniform distribution of the platinum particles having particle sizes from 3 to 8 nm. The average oxidation number of the platinum atoms was 2.5, and the number of immediately adjacent platinum atoms was 2.

COMPARISON EXAMPLE 4

A further comparison catalyst was prepared analogously to Comparison Example 1. In contrast to Comparison Example 1, tetraamineplatinum(II) nitrate was used as the platinum precursor substance. Coating of the honeycomb body and thermal treatment were carried out as in Comparison Example 1.

Physicochemical testing of the catalyst showed inhomogeneous distribution of the platinum particles on the carrier materials having particle sizes from 5 to 20 nm. The average oxidation number of the platinum atoms was 3.2. No immediately adjacent platinum atoms could be detected.

COMPARISON EXAMPLE 5

A further comparison catalyst was prepared analogously to Comparison Example 1. In contrast to Comparison Example 1, hexachloroplatinic acid ($H_2PtCl_6 \cdot 6H_2O$) was used as the platinum precursor substance. Coating of the honeycomb body and thermal treatment were carried out as in Comparison Example 1.

Physicochemical testing of the catalyst showed inhomogeneous distribution of the platinum particles on the support materials having particle sizes from 10 to 25 nm. The average oxidation number of the platinum atoms was 3.5. No immediately adjacent platinum atoms could be detected.

TABLE 2

Composition of and preparation conditions for the tested catalysts

| Ex. | Platinum salt | Concentration [g/l] | Weight ratio aluminum silicate/zeolite | Platinum load [g/l] | Calcination of the powder material | Reduction of the calcined coating |
|---|---|---|---|---|---|---|
| E1 | $(EA)_2Pt(OH)_6$ | 126 | 6:1 | 3.17 | spray calcination | yes |
| E2 | $(EA)_2Pt(OH)_6$ | 126 | 6:1 | 1.41 | spray calcination | yes |
| E3 | $(EA)_2Pt(OH)_6$ | 126 | 6:1 | 0.705 | spray calcination | yes |
| CE1 | $(EA)_2Pt(OH)_6$ | 126 | 6:1 | 3.17 | oven calcination | yes |
| CE2 | $(EA)_2Pt(OH)_6$ | 126 | 6:1 | 3.17 | oven calcination | no |
| CE3 | $(EA)_2Pt(OH)_6$ | 126 | 6:1 | 3.17 | none | yes |
| CE4 | $Pt(NH_3)_4(NO_3)_2$ | 126 | 6:1 | 3.17 | oven calcination | yes |
| CE5 | $H_2PtCl_6 \cdot 6H_2O$ | 126 | 6:1 | 3.17 | oven calcination | yes |

TABLE 3

Platinum dispersion (TEM), mean particle size of the Pt crystallites (TEM), oxidation number (XANES) and number of oxygen ligands (EXAFS) and platinum ligands (EXAFS) of the platinum of the catalysts of Examples E1 to E3 and CE1 to CE5

| Example | Platinum dispersion (TEM) | Mean particle size (TEM) [nm] | Oxidation number (XANES) | Pt ligands (EXAFS) | $O_2$ ligands (EXAFS) |
|---|---|---|---|---|---|
| E1 | very homogeneous | 3 | +2.0 | 3.9 | 1.9 |
| E2 | very homogeneous | 3 | +2.0 | 3.9 | 1.9 |
| E3 | very homogeneous | 3 | +2.0 | 3.9 | 1.9 |
| CE1 | homogeneous | 8 | +2.5 | 2.0 | 4.0 |
| CE2 | homogeneous | 8 | +3.0 | 0.5 | 3.4 |
| CE3 | homogeneous | 8 | +2.5 | 2.0 | 4.0 |
| CE4 | inhomogeneous | 20 | +3.2 | 0.0 | 5.4 |
| CE5 | inhomogeneous | 25 | +3.5 | 0.0 | 5.7 |

APPLICATION EXAMPLE 1

The service life of the catalysts was tested on a motor-car by means of a continuous test over 40,000 km having a defined course. A motor-car having a 1.9 liter DI engine and a power of 81 kW was used as the vehicle for the test and continuous running cycle. The vehicle rolling tests were carried out using a commercial diesel fuel prescribed according to Euro 2 standard and having a sulfur content of less than 500 wt.-ppm.

The measuring devices listed in Table 4 were used for measuring the gas components contained in the exhaust gas.

TABLE 4

List of measuring devices for measuring the exhaust gas concentration

| Analysed gas | Measuring device | Manufacturer |
|---|---|---|
| $O_2$ | Oxymat | Siemens AG |
| HC | FID | Pierburg Meβtechnik |
| $NO_x$ | CLD 700 Elht | Zellweger ECO-Systeme |
| CO | Binos | Rosemount |
| $CO_2$ | Binos | Rosemount |
| $SO_2$ | Binos | Rosemount |

The measured pollutant emissions of the catalysts in the European MVEG-A test cycle are listed in Table 5.

TABLE 5

Pollutant emissions of catalysts E1, CE1, CE2 and CE3 after a continuous run of 40,000 km in a motor-car having a 1.9 liter DI engine and a power of 81 kW. EU3 denotes the pollutant limit values for motor-cars in the European Union which are valid from the year 2000 onwards

| Example | CO [g/km] | HC [g/km] | NOx [g/km] | Particles [g/km] |
|---|---|---|---|---|
| EU3 | 0.65 | 0.06 | 0.5 | 0.05 |
| E1 | 0.43 | 0.04 | 0.43 | 0.02 |
| CE1 | 0.65 | 0.05 | 0.44 | 0.02 |
| CE2 | 0.75 | 0.06 | 0.44 | 0.02 |
| CE3 | 0.68 | 0.06 | 0.44 | 0.02 |

APPLICATION EXAMPLE 2

Exhaust gas catalysts of modern diesel engines are very frequently subjected to continuous operation at very low exhaust gas temperatures. In that operating state, the exhaust gas temperatures are below the normal working temperature of the catalysts. Hydrocarbons and soot particles are therefore increasingly deposited on the catalysts and, when a change to full-load operation is made and the working temperature of the catalysts is reached, they burn within a short time and, as a result of the large amount of heat that thus evolves, lead to damage of the catalysts. Such conditions occur whenever the driver changes after a very long drive in low-load operation to operation with a higher load.

Such operating states can be simulated on a roller type test stand by so-called idling/soot burn off ageing. First of all, the vehicle is operated for 8 hours in idling operation at exhaust gas temperatures of 100° C. in the presence of catalyst. The vehicle is then suddenly accelerated to full-load operation. This leads to burning of the hydrocarbons deposited on the catalyst and of carbon black within a short time, with temperature peaks of up to 800° C. and above. That cycle of idling operation and full-load operation can be repeated several times in order forcibly to age the catalyst.

The catalysts of Example E1 and of Comparison Examples CE1 to CE3 were subjected to twelve cycles of idling and full-load operation. The light-off temperatures of the catalysts for the conversion of carbon monoxide and hydrocarbons were measured on the engine test stand before and after the idling/soot burn off ageing, which lasted 96 hours.

The calculated light-off temperatures for carbon monoxide CO and hydrocarbons are summarized in Table 6 both for the fresh state and after ageing.

TABLE 6

Light-off temperatures ($T_{50}$ = temperature at which 50% conversion takes place) for CO and HC in the fresh state and after 96 idling/soot burn off ageing of catalysts E1, CE1, CE2 and CE3

| Example | $T_{50,CO}$ [° C.] fresh | $T_{50,CO}$ [° C.] aged | $T_{50,HC}$ [° C.] fresh | $T_{50,HC}$ [° C.] aged |
|---|---|---|---|---|
| E1 | 135 | 145 | 145 | 154 |
| CE1 | 138 | 163 | 146 | 164 |
| CE2 | 143 | 173 | 149 | 174 |
| CE3 | 137 | 166 | 147 | 169 |

As the results of Table 6 show, the light-off temperatures for carbon monoxide and hydrocarbons in the case of the catalyst of Example 1 according to the invention in the fresh state are comparable with the values of the comparison catalysts. After ageing, however, it exhibits markedly better light-off temperatures than the comparison catalysts. This may be attributed to the fact that in the catalyst according to the invention, the emitted hydrocarbons are burnt continuously even at very low exhaust gas temperatures. As a result, the accumulation of large amounts of hydrocarbons on the catalyst is avoided. Accordingly, the sudden burning of stored hydrocarbons that is generally associated with high temperature peaks takes place to only a lesser and substantially reduced extent in the case of the catalyst according to the invention. As a result, ageing of the catalyst is retarded.

APPLICATION EXAMPLE 3

In a further test, the catalysts of the Examples and Comparison Examples were subjected to hydrothermal ageing for 16 hours in an oven at 750° C. in air containing 10 vol. % water vapour and 20 ppm sulfur dioxide.

Before and after the hydrothermal ageing, the light-off temperatures of the catalysts for carbon monoxide and hydrocarbons were measured in a synthesis gas installation. The chosen test conditions and the gas composition are listed in Table 7. Propene was used as the hydrocarbon component.

TABLE 7

Gas composition for determining the light-off temperatures for carbon monoxide and hydrocarbons ($C_3H_6$)

| Component | Concentration | Component | Concentration |
|---|---|---|---|
| CO | 350 [vppm] | $O_2$ | 6 [vol. %] |
| $H_2$ | 117 [vppm] | $H_2O$ | 10 [vol. %] |
| $C_3H_6$ | 90 [ppm$C_3$] | $CO_2$ | 10.7 [vol. %] |
| $SO_2$ | 20 [vppm] | $N_2$ | remainder |
| NO | 270 [vppm] | | |

In order to measure the light-off temperatures, catalyst cores having a diameter of 25 mm and a length of 76 mm were used and were exposed to an amount of gas of 1950 Nl/h, corresponding to a space velocity of 50,000 h$^{-1}$. The exhaust gas was heated at a rate of 15° C./min during the measurements.

The results of the measurements are given in Table 8 for the fresh and aged catalysts.

TABLE 8

Light-off temperatures of the catalysts of Examples E1 to E3 and CE1 to CE5 in the fresh state and after ageing in an oven (16 h, 750° C., air + 10 vol. % $H_2O$ + 20 ppm $SO_2$)

| Example | $T_{50,CO}$ [° C.] | | $T_{50,HC}$ [° C.] | |
|---|---|---|---|---|
| | fresh | aged | fresh | aged |
| E1 | 123 | 183 | 142 | 197 |
| CE1 | 133 | 197 | 148 | 207 |
| CE2 | 142 | 207 | 157 | 215 |
| CE3 | 138 | 202 | 151 | 210 |
| CE4 | 148 | 215 | 161 | 235 |
| CE5 | 157 | 227 | 173 | 247 |
| E2 | 137 | 198 | 154 | 211 |
| E3 | 152 | 214 | 167 | 227 |

The catalysts of Examples E1 and CE1 to CE5 all have the same platinum content of 3.17 g/l (corresponding to 90 g/ft$^3$) and accordingly are identical in terms of their overall composition. The catalysts of Examples E2 and E3, on the other hand, have only about half and a quarter, respectively, of the noble metal content of the other catalysts and therefore cannot be compared directly with E1, CE1 to CE5. E2 and E3 have therefore been listed at the end of Table 8.

Further variations and modifications of the foregoing will be apparent to those skilled in the art and are intended to be encompassed by the claims appended hereto.

German priority application 00 104 212.6 filed Mar. 1, 2000 is relied on and incorporated herein by reference.

We claim:

1. A catalyst for purifying the exhaust gases of a diesel engine, comprising a support material containing at least one zeolite and, additionally, at least one of the support oxides selected from the group consisting of aluminum oxide, silicon dioxide, titanium dioxide, zirconium dioxide and aluminum silicate and mixed oxides thereof and at least one of the noble metals selected from the group consisting of platinum, palladium, rhodium, iridium, gold and silver, wherein atoms of the noble metals present in said catalyst have a mean oxidation number of less than +2.5, on average more than 3 metal ligands and less than 3 oxygen ligands and are present on the zeolite and support oxides in the form of crystallites having a mean particle size of from 1 to 6 nm.

2. The catalyst according to claim 1, wherein the weight ratio of the support oxides to the zeolite is from 10:1 to 2:1.

3. The catalyst according to claim 2, wherein the mass ratio of the noble metals deposited on the zeolites to the noble metals deposited on the support oxides in the catalyst is from 1:100 to 1:10.

4. The catalyst according to claim 1, wherein the noble metals are present in a concentration of from 0.05 to 10 wt. %, based on the total weight of the catalyst.

5. The catalyst according to claim 1, wherein said support oxides are present as binary or ternary mixed oxides.

6. The catalyst according to claim 1, wherein the support oxides are doped with at least one of lanthanum oxide and barium oxide.

7. The catalyst according to claim 1, wherein it contains at least one of a Y-zeolite or a ZSM-5 zeolite, both zeolites having a modulus of more than 40.

8. The catalyst according to claim 1, wherein the noble metal is platinum.

9. The catalyst according to claim 1, wherein the catalyst is in the form of a coating on inside walls of flow channels of a monolithic honeycomb carrier body in a concentration of from 50 to 400 grams per liter of volume of the honeycomb carrier body.

10. A monolithic honeycomb carrier for purifying the exhaust gases of a diesel engine, comprising an inert ceramic or metal carrier in the shape of a honeycomb having flow channels defined by the walls of the honeycomb, through which the exhaust gas passes, said walls having deposited on at least some surfaces thereof a support material containing at least one zeolite and, additionally, at least one of the support oxides selected from the group consisting of aluminum oxide, silicon dioxide, titanium dioxide, zirconium dioxide and aluminum silicate and mixed oxides thereof and at least one of the noble metals selected from the group consisting of platinum, palladium, rhodium, iridium, gold and silver, wherein atoms of the noble metals present in said catalyst have a mean oxidation number of less than +2.5, on average more than 3 metal ligands and less than 3 oxygen ligands and are present on the zeolite and support oxides in the form of crystallites having a mean particle size of from 1 to 6 nm.

11. The monolithic honeycomb carrier according to claim 10, wherein the weight ratio of the support oxides to the zeolites is from 10:0 to 2:1.

12. The monolithic honeycomb carrier according to claim 11, wherein the mass ratio of the noble metals deposited on the zeolites to the noble metals deposited on the support oxides in the catalyst is from 1:100 to 1:10.

13. The monolithic honeycomb carrier according to claim 10, wherein the noble metals are present in a concentration of from 0.05 to 10 wt. %, based on the total weight of the catalyst.

14. The monolithic honeycomb carrier according to claim 10, wherein the support oxides are binary or ternary mixed oxides of the mentioned oxides.

15. The monolithic honeycomb carrier according to claim 10, wherein the support oxides are doped with lanthanum oxide and/or barium oxide.

16. The monolithic honeycomb carrier according to claim 10, wherein it contains at least one of a Y-zeolite or a ZSM-5 zeolite, both zeolites having a modulus of more than 40.

17. The monolithic honeycomb carrier according to claim 10, wherein the noble metal is platinum.

18. An exhaust purification system for purifying the exhaust gases of diesel engines, comprising an inert honeycomb carrier having deposited on internal surfaces thereof a catalyst containing at least one zeolite and, additionally, at least one of the support oxides selected from the group consisting of aluminum oxide, silicon dioxide, titanium dioxide, zirconium dioxide and aluminum silicate and mixed oxides thereof and at least one of the noble metals selected from the group consisting of platinum, palladium, rhodium, iridium, gold and silver, wherein atoms of the noble metals present in said catalyst have a mean oxidation number of less than +2.5, on average more than 3 metal ligands and less than 3 oxygen ligands and are present on the zeolite and support oxides in the form of crystallites having a mean particle size from 1 to 6 nm.

19. The exhaust purification system according to claim 18, wherein the weight ratio of the support oxides to the zeolites is from 10:1 to 2:1.

20. A catalyst for purifying the exhaust gases of a diesel engine, comprising a support material containing at least one zeolite and, additionally, at least one of the support oxides selected from the group consisting of aluminum oxide, silicon dioxide, titanium dioxide, zirconium dioxide and aluminum silicate and mixed oxides thereof and at least one of the noble metals selected from the group consisting of platinum, palladium, rhodium, iridium, gold and silver, wherein atoms of the noble metals present in said catalyst have a mean oxidation number of less than +2.5, on average more than 3 metal ligands and less than 3 oxygen ligands and are present on the zeolite and support oxides in the form of crystallites having a mean particle size from 1 to 6 nm made by a process wherein said support oxides and the zeolites are first impregnated separately with precursor compounds of the noble metals, and then calcined in the still moist state in the course of from 0.1 to 10 seconds by being blown into combustion waste gases at a temperature of from 500 to 1000° C., and are then processed to a common coating dispersion with which a monolithic honeycomb body is subsequently coated, and the coating is then dried, calcined and, finally, reduced.

21. A catalyst for purifying the exhaust gases of a diesel engine, comprising a support material containing at least one zeolite and, additionally, at least one of the support oxides selected from the group consisting of aluminum oxide, silicon dioxide, titanium dioxide, zirconium dioxide and aluminum silicate and mixed oxides thereof and at least one of the noble metals selected from the group consisting of platinum, palladium, rhodium, iridium, gold and silver, wherein the weight ratio of the support oxides to the zeolite is from 10:1 to 2:1 and the mass ratio of the noble metals deposited on the zeolites to the noble metals deposited on the support oxides in the catalyst is from 1:100 to 1:10.

* * * * *